(12) United States Patent
DiLeo et al.

(10) Patent No.: US 7,824,548 B2
(45) Date of Patent: Nov. 2, 2010

(54) POROUS ADSORPTIVE OR CHROMATOGRAPHIC MEDIA

(75) Inventors: Anthony J. DiLeo, Westford, MA (US);
Justin McCue, Cambridge, MA (US);
Wilson Moya, Concord, MA (US); Igor Quinones-Garcia, East Brunswick, MA (US); Neil P. Soice, Amherst, NH (US);
Volkmar Thom, Goettingen (DE);
Sarah Yuan, Bedford, MA (US)

(73) Assignee: Millipore Corporation, Billerica, MA (US)

( * ) Notice: Subject to any disclaimer, the term of this patent is extended or adjusted under 35 U.S.C. 154(b) by 728 days.

(21) Appl. No.: 11/821,059

(22) Filed: Jun. 21, 2007

(65) Prior Publication Data

US 2007/0256970 A1 Nov. 8, 2007

Related U.S. Application Data

(62) Division of application No. 11/049,803, filed on Feb. 3, 2005, now Pat. No. 7,479,222.

(60) Provisional application No. 60/548,462, filed on Feb. 27, 2004, provisional application No. 60/542,025, filed on Feb. 5, 2004.

(51) Int. Cl.
*B01D 15/08* (2006.01)
(52) U.S. Cl. ............... 210/198.2; 210/502.1; 210/635; 210/656
(58) Field of Classification Search ......... 210/198.2, 210/502.1, 635, 656; 502/402
See application file for complete search history.

(56) References Cited

U.S. PATENT DOCUMENTS

| | | | |
|---|---|---|---|
| 3,527,712 | A | 9/1970 | Renn et al. |
| 4,274,985 | A | 6/1981 | Szejtli et al. |
| 4,335,017 | A | 6/1982 | Miles et al. |
| 4,452,892 | A | 6/1984 | Rosevear |
| 4,675,104 | A | 6/1987 | Rai et al. |
| 4,743,373 | A | 5/1988 | Rai et al. |
| 4,895,661 | A | 1/1990 | Capotte |
| 5,009,759 | A | 4/1991 | Serwer et al. |
| 5,075,432 | A | 12/1991 | Vanzo |
| 5,277,915 | A | 1/1994 | Provonchee et al. |

(Continued)

FOREIGN PATENT DOCUMENTS

EP 0197784 10/1986

(Continued)

OTHER PUBLICATIONS

Valle, et al. "Use of Ceramic Monoligths as Stationary Phase in Affinity Chromatography" Biotechnol. Prog. 2003 19, 921-927.

(Continued)

*Primary Examiner*—Ernest G Therkorn

(57) ABSTRACT

A porous substrate capable of adsorptive filtration of a fluid having a porous self-supporting substrate and one or more porous, adsorptive polymeric coatings comprising from about 1 to about 80% of the void volume of the pores of the substrate. The resultant substrate has good convective and diffusive flow and capacity. The substrate may be cross-linked, have one or more capture chemistries attached to it and is useful as a chromatography media for the selective filtration of desired species including biomolecules such as proteins and DNA fragments.

24 Claims, 7 Drawing Sheets

U.S. PATENT DOCUMENTS

| | | | |
|---|---|---|---|
| 5,328,603 | A | 7/1994 | Velander et al. |
| 5,492,723 | A | 2/1996 | Sanderson et al. |
| 5,522,994 | A | 6/1996 | Frechet et al. |
| 5,672,416 | A | 9/1997 | Radola et al. |
| 5,814,567 | A | 9/1998 | Yahiaoui |
| 5,895,575 | A | 4/1999 | Kraus et al. |
| 5,897,779 | A | 4/1999 | Wisted et al. |
| 5,945,175 | A | 8/1999 | Yahiaoui et al. |
| 6,562,573 | B2 | 5/2003 | Halaka |
| 6,635,174 | B1 | 10/2003 | Berg et al. |
| 7,479,222 | B2 * | 1/2009 | DiLeo et al. ............. 210/198.2 |
| 2002/0134729 | A1 * | 9/2002 | Muranaka et al. ........... 210/656 |
| 2003/0155676 | A1 | 8/2003 | Lubda et al. |
| 2009/0050566 | A1 * | 2/2009 | Kozlov et al. ............... 210/656 |

FOREIGN PATENT DOCUMENTS

| | | |
|---|---|---|
| EP | 0328256 | 8/1989 |
| EP | 0474617 | 3/1992 |
| EP | 146723 | 10/2004 |
| EP | 1470854 | 10/2004 |
| WO | WO 00/44928 | 8/2000 |
| WO | WO 00/50160 | 8/2000 |
| WO | WO 03/008078 | 1/2003 |

OTHER PUBLICATIONS

Svec, "Organic Polymer Support Materials" Chromotographic Science Series 2002 87, 2nd Ed., 17-48.

Hamaker, et al. "Rolled Stationary Phases: Dimensionally Strucured Textile Adsorbents for Rapid Liquid Chromatography of Proteins" Ind. Eng. Chem Res 1999, 38, 865-872.

Eveleigh, et al. "Immunochemical Characteristics and Preparative Application of Agarose-Based Immunosorbents" J. Solid-Phase Biochemistry, 1997, 2(1) 45-78.

Snyder, "Introduction to Modern Liquid Chromatorgraphy", John Wiley, 1979, pp. 493-494.

International Search Report PCT/US2005/003281.

* cited by examiner

POROUS ADSORPTIVE OR CHROMATOGRAPHIC MEDIA

CROSS REFERENCE TO RELATED APPLICATIONS

This application is a divisional of U.S. application Ser. No. 11/049,803, filed on Feb. 3, 2005, now U.S. Pat. No. 7,479, 222 which claims the benefit of U.S. Provisional Application No. 60/548,462, filed on Feb. 27, 2004, and of U.S. Provisional Application No. 60/542,025, filed on Feb. 5, 2004.

BACKGROUND OF THE INVENTION

Chromatography is a general separation technique that uses the distribution of the molecules of interest between a stationary phase and a mobile phase for molecular separation. The stationary phase refers to a porous media and imbibed immobile solvent. Columns with associated end caps, fillings and tubing are the most common configuration, with the media packed into the tube or column. The mobile phase is pumped through the column. The sample is introduced at one end of the column, and the various components interact with the stationary phase and are adsorbed to or in the media or traverse the column at different velocities. The separated components are collected or detected at the other end of the column. Adsorbed components are released in a separate step by pumping an eluant solvent through the column. Chromatographic methods included among other methods, gel chromatography, ion exchange chromatography, hydrophobic interaction chromatography, reverse phase chromatography, affinity chromatography, immunoadsorption chromatography, lectin affinity chromatography, ion affinity chromatography and other such well-known chromatographic methods. Current "state of the art" chromatographic or adsorptive separations use bead-based, monolith or membrane media to accomplish the desired separation. These three technologies (beads, monoliths and membranes) accomplish separations via differing physical forms and therefore operate in phenomenologically different ways. A major difference between these three media is the relationship between the adsorbing surface (where adsorption of an entity to a ligand or ligands occurs) and the convective fluid flow.

Bead based media have convective flow occurring at the bead surface while most of the adsorbing surface is internal to the bead and can only be reached via diffusion. The convective fluid flow properties are determined by the bead size. Smaller beads require higher pressure to attain equivalent flow in a column. However, the equilibrium adsorbing capacity is not determined by the bead size. Therefore, the static capacity and the flow properties of the materials are not necessarily coupled or interdependent. However, because most of the capacity is accessed through diffusion, the dynamic binding capacity (capacity in a flow-through mode at a given flow rate) is coupled to the bead size and therefore to the convective flow properties of the adsorbent.

Typically in the area of chromatographic separations, polysaccharide polymers, such as agarose, are used to make gel media by thermally phase separating the polymer from an aqueous solution. This can be done because these polymers have a melting point and a gel point. To process agarose for example, the polymer must be heated above its melting temperature, which is about 92° C., and dissolved in the presence of water. At or above that temperature, the polymer melts and the molten polymer is then solvated by water to form a solution. The polymer remains soluble in water as long as the temperature is above the polymer's gel point, which is about 43° C. At and below the gel point, the polymer phase separates and becomes a hydrogel that takes on whatever shape the solution was just before gelling. Additionally, as the agarose approaches its gel point, the viscosity of the solution becomes higher and higher as the hydrogel begins to form.

Traditionally, for polysaccharide beads, such as are used in chromatography media, the heated solution is kept above its gel point and it is stirred into an immiscible, heated fluid, such as mineral or vegetable oil, to form beads. The two-phased material (beads of agarose in the immiscible fluid) is then cooled and the beads are recovered. The beads themselves are diffusionally porous and can then be used as made for size exclusion chromatography. Preferably, they are further processed by crosslinking, the addition of various capture chemistries such as affinity chemistries or ligands, positive or negative charge, hydrophobicity or the like or combinations of crosslinking and chemistries to enhance their capture capabilities.

The beads are then loaded into a chromatography column forming a bed of media through which a fluid containing the material to be captured is passed. The beads are then washed to remove unbound contaminants and then the captured material is eluted from the beads and collected.

Several problems exist with this type of media. The packing of the beads into a column is a difficult and laborious task. One needs to be sure that the column is properly packed so as to avoid channeling, bypass and blockages within the column. Packing of columns is often considered as much an art as it is a science.

The use of beads limits the depth of the media in process applications because of the pressure that must be overcome. Excess pressure may compress the beads or require expensive pressure retaining capacity for the column. Softer beads tend to compress more than rigid beads. Compression is indicated by a steep increase in pressure drop across the bed at sufficiently high flow rates. High pressure drop is due to compression of the beads and subsequent reduction of void volume in a small zone near the column outlet. The cumulative drag force of the flowing liquid through the bed causes compression. Drag force increases with higher flow rates, resulting in higher flow resistance and with bed height. One often needs to run a soft gel bead system at a slower rate in order to ensure that the pressure drop is within acceptable bounds.

As the beads are porous and the selected molecule to be captured must diffuse into the pores of the media to be captured, the speed and capacity of the system are diffusionally limited. There are two diffusional limitations, one surrounding the bead where a film of material may form and inhibit movement of the selected molecule to the surface of the bead and a second internal diffusional resistance which is determined by the size, number and length of the pores formed in the bead surface. Additionally, the permeability of the media is related to bead size (which can vary widely) as well as the media stability. Larger beads and beads with larger pores tend to have higher permeability. Beads that are not subject to or less subject to compression (by the weight of the beads above them coupled with the pressure under which the fluid flows through the bed) also tend to have greater permeability. However, at high flow rates, permeability does decrease and dynamic capacity also decreases.

An alternative has been to use membrane or monolithic adsorbers. For membrane and monolithic media, the convective flow is directly in contact with absorbing surface. Absorbing entities do not have to rely on diffusion to reach the absorbing surface. Because the convective flow is in direct contact with the absorbing surface in monolithic and membrane media, the fluid flow and absorbing capacity are coupled. For example, the surface area of a membrane decreases with increasing average pore size. Because the binding capacity is only a surface phenomenon in this design, as the pore size increases the binding capacity decreases. However, one advantage of this surface dominated binding is that the dynamic capacity is essentially the same as the equilibrium or static capacity because there is no mass transfer resistance provided by the structure of the media to absorption. Equilibrium or static capacity refers to the quantity of the target molecule that is absorbed or adsorbed after a contact time sufficient to ensure thermodynamically complete utility of absorption or adsorption sites in the media. Unfortunately, because the surface area dictates the binding capacity, there are limits to the binding capacity one can achieve for a given permeability due to the coupled flow and binding properties.

One example of a surface functionalized monolith is taught by Cerro et al., Biotechnol. Prog 2003, 19 921-927 (Use of ceramic monoliths as stationary phase in affinity chromatography), in which thin, surface-active only, agarose coatings on ceramic monoliths were created by impregnating the monolith with the traditional hot solution of agarose, followed by removal of excess hot agarose solution from the cells within the monolith using compressed air and subsequently cooling the monolith to gel the agarose coating.

One of the major problems with this coating process is that the coatings are difficult to effect on porous materials. In the article mentioned above, the agarose had to be applied in a heated state (thus requiring a substrate that is heat stable) making its application difficult to control as gelling occurred as the temperature dropped. A further problem is that only very thin coatings that have only surface activity can be created as occurs in membrane adsorbers. In part, this may be due to the method used for removing excess agarose. It may also be a function of the agarose gel point and the higher viscosity that occurs as the temperature of the agarose approaches the gel point. Moreover, the prior art process would be very difficult if not impossible with substrates having pores that are relatively small in comparison to the cell size of the monoliths of the prior art. The reason for these difficulties is that in some cases, air cannot be readily forced through certain porous materials without disrupting or otherwise damaging the porous structure, as is the case with certain fabrics or porous membranes. Therefore relatively large pored, rigid monolithic structures must be used.

WO 00/44928 suggests another approach by forming a temperature stable agarose solution through the use of high levels (8 M) of chaotropes such as urea. Agarose of this invention is imbibed into a porous support to form a continuous phase. Water is carefully added such that a gel layer forms at the interfaces between the agarose solution and the added water. The gel layer prevents migration of the agarose but allows further migration of the water and urea molecules out of the agarose solution into the added water. This process continues until the agarose solution turns into a gel within the interstices of the pores of the porous substrate.

One major problem with this prior art method is that the process by which it is made causes the pores of the substrate to be substantially blocked, severely limiting convective flow through the porous support. Additionally, the diffusional resistance is high, limiting the ability of the media to work rapidly.

What is desired is a porous adsorptive or chromatographic media having good convective and diffusional flow. More particularly, what is desired is has a porous adsorptive or chromatographic media formed of a porous substrate having a porous coating that allows for good convective flow through the porous substrate with diffusive flow within the coating itself that provides for good dynamic capacity.

SUMMARY OF THE INVENTION

The present invention relates to porous adsorptive or chromatographic media and methods of making them. More particularly, it relates to porous adsorptive or chromatographic media having one or more porous polymeric based coatings and which have good convective and diffusional flow characteristics and high dynamic capacity.

In order to overcome the limitations associated with bead, membrane and monolithic media, a new composite media was invented. This novel composite media can increase dynamic binding capacity independent of the convective flow properties. This novel media is a porous substrate material (e.g. a membrane, non-woven, monolith, fiber and/or other porous materials) coated with a permeable, porous hydrogel layer of sufficient thickness to increase binding capacity, but no so thick as to add significant diffusional resistance. The average thickness of this adsorbing layer will vary depending on the porous material characteristics and application targeted. The pores of the substrate after coating preferably are permeable so as to allow cells and/or cellular debris to pass through them and the hydrogel layer must be permeable to large entities such as proteins, DNA fragments and other selected molecules.

The novel composite media also circumvents a problem associated with bead media. Typically, a bead media's mechanical strength is coupled to the adsorbing material being used. For example, agarose beads are common adsorbents in chromatographic applications. Agarose beads must be modified, such as by crosslinking, to increase their mechanical integrity in order to operate at reasonable flow rates. This modification can change the binding performance of the resulting material. Having the mechanical and binding properties coupled is a limitation associated with many bead media. The present invention relies upon the underlying substrate for its strength and the coating for its adsorptive properties.

Another advantage of this composite media is the ease of handling. In general, beads must be packed into a column. The quality of this packing determines the performance of the adsorbing bed. This adds another source of variability to the chromatographic process and must be validated before use. The novel composite media could operate in several device forms, all which can be "packed" and validated prior to use, eliminating a source of variability during the chromatographic process.

Using the present invention, one can coat the surfaces of any article, including irregular materials such as porous materials, including the interior surfaces of their pores, with a layer of the porous polymer without substantially blocking the pores of the substrate with the coating so as to allow for convective flow through the porous substrate. Additionally, the coating is thick enough and porous enough to allow for diffusive flow to occur within that layer itself.

In a preferred embodiment, the coating is in the form of a porous polymer and is coated from a solution onto the surfaces of a preformed porous substrate. In one embodiment, all or a portion of the solvent in the coating solution is evaporated before the coating material is gelled. In this embodiment, the optional use of wetting agents such as surfactants helps in forming relatively uniform and continuous coatings.

It is an object of the present invention to provide a media for chromatographic or adsorption separations comprising a porous coated substrate the substrate being a porous (PS1), self-supporting structure and having one or more porous (PS2) coatings on at least a portion of all surfaces of the substrate, the one or more coatings occupying a fractional porosity of the structure of at least 1%, preferably from about 20% to about 65% and the one or more coatings being sufficiently porous so as to allow for the adsorption of molecules such as biomolecules within its bulk. The porous nature of the substrate is that of large pores through which the mobile phase flows and contacts the stationary phase, that is, the media. This is referred to as "Porous System 1." (PS1) The porous nature of the coating, Porous System 2, (PS2) refers to the pores in the coating, into which the dissolved species of the mobile phase permeate, and have their velocity changed by interaction with the coating or are adsorbed.

It is an object of the present invention to provide a media for chromatographic or adsorption separations comprising a porous coated substrate the substrate being a porous (PS1), self-supporting structure and having one or more porous (PS2) coatings on at least a portion of all surfaces of the substrate, the substrate being selected from the group consisting of fibers, woven fabrics, non-woven fabrics, felts, mats, monoliths and porous membranes, and one or more porous polymeric coatings on all surfaces of the substrate, the one or more coatings occupying from about 1 to about 50%, preferably from about 1 to about 50% of the void volume of the pores of the substrate and the substrate having good convective flow and diffusional flow.

It is an object of the present invention to provide a media for chromatographic or adsorption separations comprising a porous coated substrate the substrate being a porous (PS1), self-supporting structure and having one or more porous (PS2) coatings on at least a portion of all surfaces of the substrate, the substrate selected from the group consisting of fibers, woven fabrics, non-woven fabrics, felts, mats, monoliths and porous membranes, and one or more porous polymeric coatings on all surfaces of the substrate, the one or more coatings occupying from about 10 to about 50% of the void volume of the pores of the substrate and the media has good convective flow and diffusional flow.

It is an object of the present invention to provide a media for chromatographic or adsorption separations comprising a porous coated substrate the substrate being a porous (PS1), self-supporting structure and having one or more porous polymeric (PS2) coatings on at least a portion of all surfaces of the substrate, the one or more coatings occupying from about 10 to about 50% of the void volume of the pores of the substrate and dynamic binding capacity of the media is independent of the convective flow properties of the media.

It is an object of the present invention to provide a media for chromatographic or adsorption separations comprising a porous coated substrate, the substrate being a porous (PS1), self-supporting structure and having one or more porous polymeric coatings (PS2) on at least a portion of all surfaces of the substrate, the base substrate being a porous, self-supporting structure selected from the group consisting of woven fabrics, non-woven fabrics, felts, mats, fibers, monoliths and porous membranes, and one or more porous coatings on all surfaces of the substrate, the one or more coatings occupying from about 10 to about 50% of the void volume of the pores of the substrate, the one or more coatings being formed of one or more polymers and the substrate having good convective flow and diffusional flow.

These and other objects of the present invention will be described in greater detail below in the specification and claims.

DETAILED DESCRIPTION OF THE INVENTION

The present invention relates to a porous chromatographic or adsorptive media having a porous, polymeric coating (PS2) formed on a porous self-supportive substrate (PS1) such that the coating is at least 10% of the void volume of the structure and is capable of adsorbing biomolecules, such as proteins, DNA fragments or other selected molecules within its bulk. More particularly, the present invention relates to a porous chromatographic or adsorptive media having a porous polymeric coating (PS2) formed on a porous self-supportive substrate (PS1) such that the media retains at least 20% of the initial void volume of the substrate and has good convective and diffusional flow and high dynamic capacity.

Figure 1:
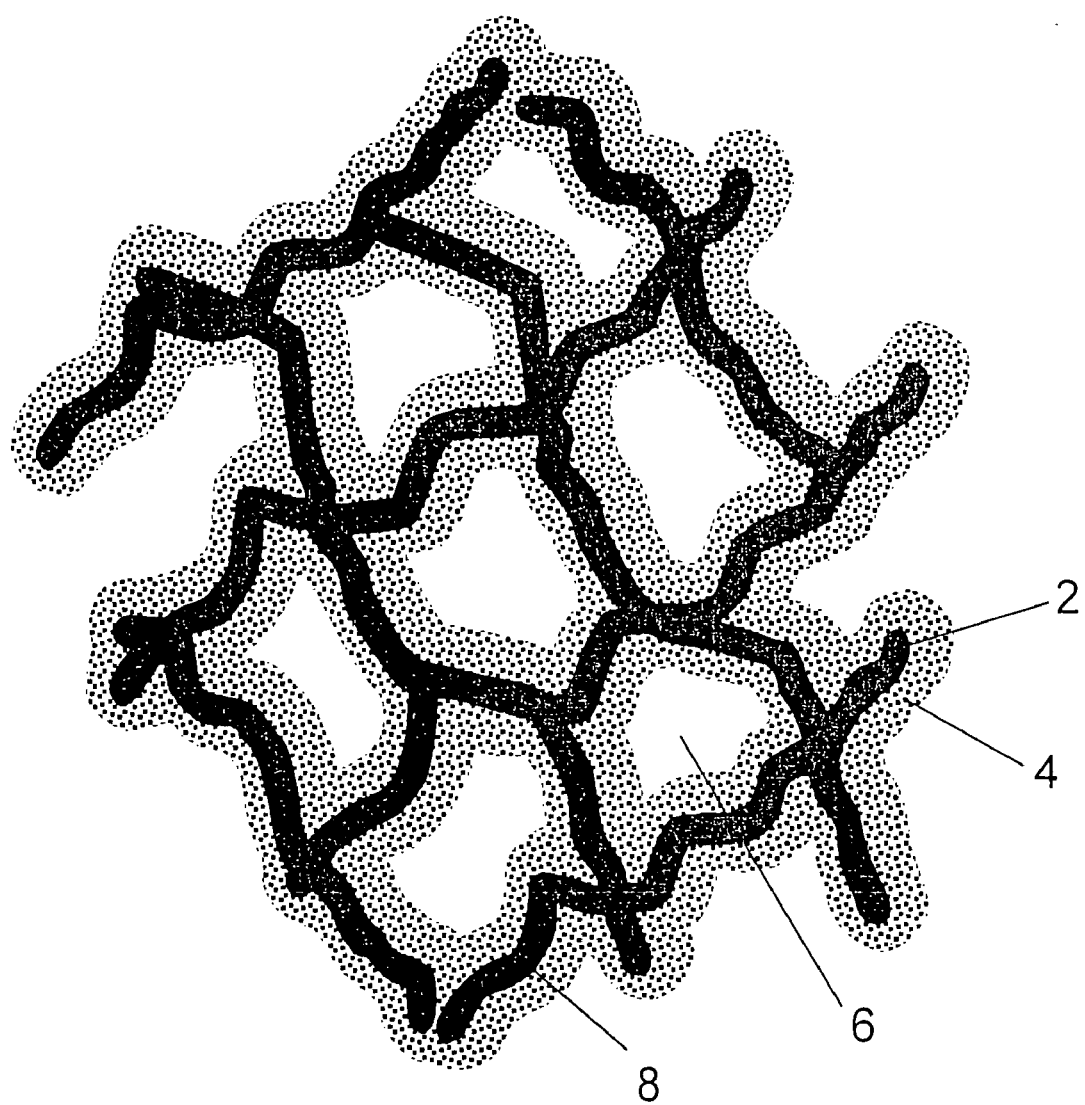
FIG. 1 shows a planar view of a portion of an embodiment according to the present invention.

FIG. 1 shows a first embodiment of the present invention. The media is formed of a porous substrate (PS1) 2, the surfaces of which are at least partially coated by one or more porous coatings (PS2) 4. As can be seen from the Figure, the substrate has a series of large pores 6 separated from each other by interconnecting walls 8.

Figure 2:
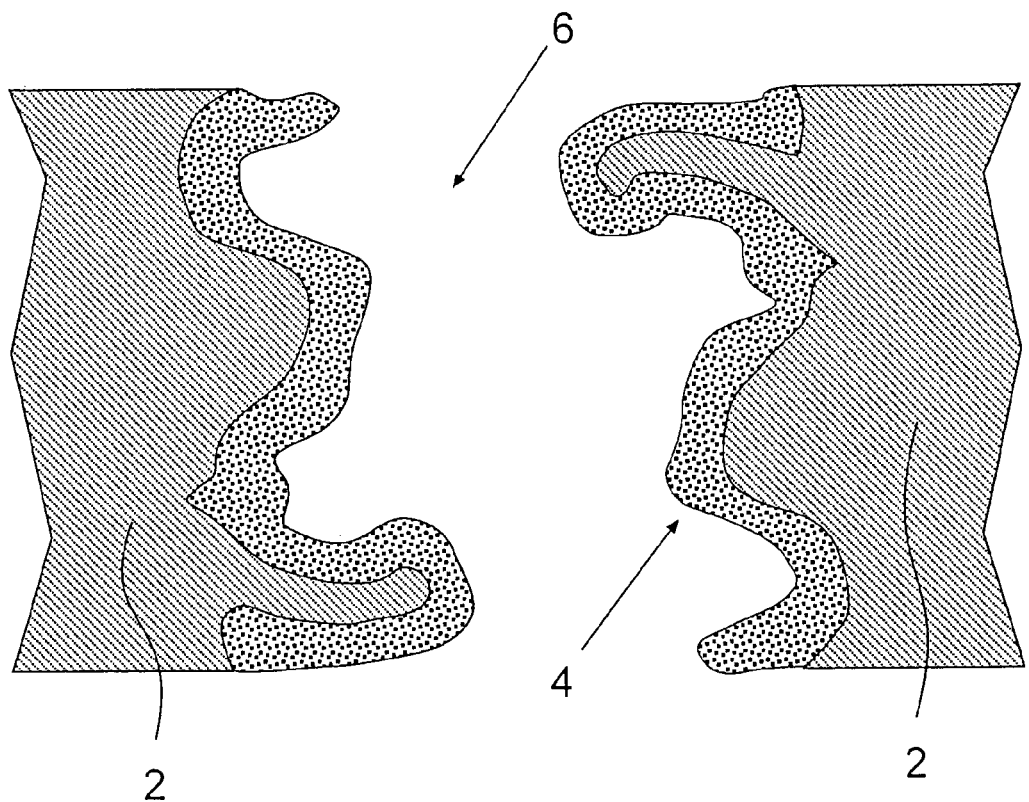
FIG. 2 shows a cross sectional view of a portion of an embodiment according to the present invention.

FIG. 2 shows a close up cross-sectional view of one pore 6 of the substrate 2 with the coating 4 in place. As shown, the coating is at least partially in contact with the surface of the substrate; preferably it is substantially in contact with surface of the substrate to form a relatively uniform coating surface.

Such a substrate can be a fiber, non-woven fabric, woven fabric, mat, felt, membrane or a monolith as explained in further detail below. The substrate, even with the coating(s), has high permeability and good flow and capacity characteristics. The substrate is self-supportive and provides a platform or structural network for the coating(s).

It is preferred that the substrate selected be highly porous, so that there is minimal, but sufficient wall or solid material within it to provide the structural integrity and high porosity and flow. The pore sizes of pore system may vary from about 1 to about 1000 microns, preferably 10 to 300 microns, more preferably from about 50 to about 200 microns and more preferably from 50 to 100 microns, depending upon the fluid and the constituent that is desired to be captured from it. For example, in an application to capture a desired protein from an unclarified, lysed cell broth, the pores of the substrate should be sufficiently large enough to allow good permeability at high flow rates of the broth through the media, i.e., the coated substrate, while still allowing for a high level of capture on a single pass, such as greater than 50%. In the above application, a pore size of from about 100 to about 300 microns would be preferred. In an application starting with clarified or clean feedstreams, the pore size can be smaller, form about 30 to about 60 microns. For laboratory devices such as syringe filters, or microtiter plates, which are used with a variety of solution conditions, smaller pores are preferred when clean, very dilute solutions are used. These pores are from about $0.1\mu$ to about $10\mu$.

The coating(s) themselves are also porous in nature (PS2) so that they are permeable to biomolecules. Preferably they are capable of adsorbing biomolecules within their bulk, namely within the pores formed within the coating(s). The coating(s) are thick enough to create these pores and have some diffusional flow into them, thereby increasing overall capacity of the structure above that of the surface alone and in some applications selectivity of the capture, but they are sufficiently thin so that the diffusion length is limited and not a negative factor in performance either in capturing or releasing the biomolecules.

The coating(s) typically constitute at least 1% of the total volume of the coated substrate. Preferably they are from about 5% to about 80% of the total volume of the coated substrate.

By another measure, on average, the coatings reduce the average diameter of the substrate pores by an amount from about 1% to about 80%, preferably from about 10% to about 50%, more preferably from about 20% to about 50% from that of the uncoated substrate.

By another measure, the coatings reduce the permeability of the substrate by an amount from about 5% to about 80% of that of the uncoated substrate.

Another method for determining the amount of coatings used is fractional porosity, which is important for ensuring the flow through the coated substrate. Fractional porosity is the ratio of volume within the coated substrate that is available to the solution being processed to the total volume of the coated substrate. A higher fractional porosity gives a higher inherent flow capacity to the coated substrate. For the coated substrates of the present invention, preferred fractional porosities are from about 0.35 to about 0.55.

The coating(s) are generally from about 1 to 100 microns in thickness, preferably from about 2 to about 20 microns in thickness and more preferably from about 5 to about 15 microns in thickness. Thickness refers to the change in the characteristic measure of the solid phase of the substrate. For example, for a woven or non-woven fabric, the change in the radius of the characteristic fiber is the coating thickness. The diameters of pores of the coating(s) (PS2), may vary within the range of those commonly used in chromatography or from about 1 to about 200 nanometers, preferably from about 1 to about 100 nanometers, more preferably from about 1-50 nanometers. They should be of a size sufficient to allow for the passage or permeation of the desired material into them, such as proteins, DNA or RNA fragments, plasmids or other biomolecules, synthetic molecules such as oligonucleotides, other selected molecules and the like.

In a preferred embodiment the coating covers the surfaces of the substrate to a substantially uniform thickness. To accomplish this requires routine trials in which the coating solution viscosity, substrate pore size, method of removing excess solution and drying procedures are optimized to obtain this end. In general, a practitioner, once aware of the teachings of this invention will determine an approximate coating thickness that will optimize capacity and adsorption and release rates for the desired selected molecule. He will then choose a substrate with a pore size and a porosity such that this thickness will not overly reduce flow. Routine trial and error experimentation, based on the teachings of the present invention, will provide a skilled practitioner a route to the correct formulation and drying method.

In a preferred embodiment, substantially all surfaces are covered with the porous coating, preferably of a uniform thickness.

The structure of the present invention has good hydraulic permeability. Hydraulic permeability is the measure of flow through the media, given as volume flow per facial or frontal area per time, normalized for pressure. Flow is the volume passing through the media per unit time. The present invention has inherent flow even at relatively low pressure (1 bar), and has a stable flow at relatively high flow rates such as 300 cm/hr or greater. Preferably, flow is relatively linear with pressure from about 1 cm/hr to about 500 cm/hr.

The media also has good capacity. Generally, this means there is a relatively high surface area available to be in direct contact with the fluid flowing through the structure as compared to the surface area of the underlying substrate. Typically, a media according to the present invention has a surface area that is at least 25%, preferably, 50% and preferably 75% higher than the surface area of the substrate itself due to the porosity of the coating.

The substrate may be a fiber, a sheet such as a woven fabric, a non-woven, a mat, a felt or a membrane or it may be a three dimensional structure such as a sponge, poly(HIPES) or other monolithic structure such as a honeycomb, or a porous bead such as a controlled pore glass, porous styrene beads, silica, zirconia and the like. Preferably, the substrate is a sheet formed of a woven or non-woven fabric or a membrane.

Fibers may be of any length, diameter and may be hollow or solid. They are not bonded together as a substrate (although as discussed below, they may be formed into an unitary structure after application of the coating) but are individual discrete entities. They may be in the form of a continuous length such as thread or monofilament of indeterminate length or they may be formed into shorter individual fibers made by chopping fibrous materials such as non-woven or woven fabrics, cutting the continuous length fiber into individual pieces, formed by a crystalline growth method and the like.

Non-woven fabrics are flat, porous sheets made directly from separate fibers bonded together by entangling fiber or filaments, thermally or chemically. Typically, nonwoven fabric manufacturers supply media having from 1 to 500 micron mean flow pore (MFP) ratings. For non-woven fabrics, the porous structure is the entangled fibers, and porosity refers to the tortuous spaces between and among the fibers. Porosity has a similar meaning for felted fabrics. A preferred non-woven is by Freudenberg Nonwovens NA of Lowell, Mass. and is type FO2463.

Woven fabrics are produced by the interlacing of warp fibers and weft fibers in a regular pattern or weave style that is at some predefined angle to each other. Typically the weft is at an angle of about 90 degrees to that of the warp. Other commonly used angles include but are not limited to 30, 45, 60 and 75 degrees. The fabric's integrity is maintained by the mechanical interlocking of the fibers cause by the weaving process. Drape (the ability of a fabric to conform to a complex surface), surface smoothness and stability of a fabric are controlled primarily by the weave style, such as plain, twill, satin, basket weave, leno, etc. In this case, the substrate porosity is the space between the fibers and is of a less tortuous nature.

Monoliths are blocks of porous material. They can be rectangular, cylindrical, or foamed into other shapes. Examples are ceramic monoliths, which are ordered structures of packed rectangular or triangular capillaries. These are supplied by Engelhard, Inc of Huntsville, Ala. and Corning, Inc of Corning, N.Y. One form of polymeric monoliths are made from sintered plastic particles by Porex Corporation of Fairburn, Ga.

Poly(HIPES) [high internal phase emulsion] materials are mechanically stable isotropic, open celled polymeric foams. These, and other macroporous polymer structures are described in "Porous polymers and resins for biotechnological and biomedical applications" H.-P. Hentze and M. Antonietti Reviews in Molecular Biotechnology 90 (2002) 27-53

The substrate may be formed from a variety of materials including glass, plastics, ceramics and metals.

Borosilicate glass is one example of a suitable glass. It can be formed as fibers, glass mats or porous beads such as the controlled pore glass beads available from Millipore Corporation of Billerica, Mass.

Various ceramics based on the more conventional silicate chemistries or more exotic chemistries such as yttrium, zirconia, titanium and the like and blends thereof can be used. They can be formed into beads, fibers, mats, felts, monoliths or membranes.

Metals such as stainless steel, nickel, copper, iron or other magnetic metals and alloys, palladium, tungsten, platinum, and the like maybe made into various forms including fibers, sintered sheets and structures, such as sintered stainless steel or nickel filters, woven screens and non-woven mats, fabrics and felts such as stainless steel wool.

The preferred substrate is made from plastic, more preferably thermoplastics. Preferred thermoplastics include but are not limited to polyolefins such as polyethylenes, including ultrahigh molecular weight polyethylenes, polypropylenes, sheathed polyethylene/polypropylene fibers, PVDF, polysulfone, polyethersulfones, polyarylsulphones, polyphenylsulfones, polyvinyl chlorides, polyesters such as polyethylene terephthalate, polybutylene terephthalate and the like, polyamides, acrylates such as polymethylmethacrylate, styrenic polymers and mixtures of the above. Other preferred synthetic materials include celluloses, epoxies, urethanes and the like.

Suitable coating materials include but are not limited to the following polymers, polyvinyl alcohols, acrylates and methacrylates, polyallylamines, polysaccharides such as agaroses, dextrans, cyclodextrans, celluloses, substituted celluloses and the like and may be used in concentrations from about 0.5 to about 20, preferably from about 1 to about 10% by weight of the solution.

A preferred process for forming the present invention comprises the steps of a) forming a room temperature stable coating solution of one or more polymers, a solvent for the polymer(s) and one or more gel-inhibiting agents, if required; b) wetting a porous substrate with that solution, optionally removing excess solution; c) evaporating the solvent from the solution to cause the coating to conform to the surfaces of the substrate; d) if necessary due to use of gel-inhibiting agents, wetting the coated substrate with a gelling agent that is a nonsolvent for the polymeric and is a solvent for the gel-inhibiting agents; and e) rinsing the coated substrate. Additionally, optional steps include crosslinking the substrate and/or adding a functionality to the surface of the coating.

For those polymers that are either soluble in water at room temperature, such as some dextrans and low gel point agaroses or which are not soluble in water, such as cellulose, polyvinyl alcohols, other vinyl containing compounds, acrylates, methacrylates and the like, other processes and solvents can be used.

For example, for cellulose, one may use a solvent such as N,N-dimethylacetamide and saturate the solvent with a salt such as lithium chloride and coat the material on to a substrate and then remove the solvent and salt in water.

For dextrans and low gel point agaroses that are soluble in room temperature water, the use of the gel-inhibiting agent is not required. A preferred method for these materials is to form a coating dissolved in water with a suitable crosslinker such as polyethylene glycol diglycidyl ether, one or more porogens such as polyacrylamide solution (10% in water). The coating is applied, dried and then the media is heated to crosslink the dextran or low gel point agarose. The porogen is removed by washing or extraction in water.

Homogeneous water solutions of polyvinyl alcohol (PVA) and polyalkylene glycols can be used to make porous coatings. PVA polymers useful for this purpose are those with an average degree of polymerization in the range of 500 to 3,500 and a degree of saponification in the range of 85 to 100 mole percent, or PVA copolymers containing less than 10 mole percent of monomers such as ethylene, vinyl pyrrolidone, vinyl chloride, methyl methacrylate, acrylonitrile and/or itaconic acid. Polyalkylene glycols employable according to this invention have an average molecular weight in the range of 400 to 4,000 and, preferably, in the range of 600 to 3,000 and have a carbon-to-oxygen ratio of not more than 3.

A typical solution comprises polyvinyl alcohol polymer containing 15 to 150 weight parts of a polyalkylene glycol per 100 weight parts of polyvinyl alcohol. PVA polymer is coagulated by one of the following procedures: (1) extruding an aqueous solution of PVA polymer into an aqueous solution of a dehydrating salt such as sodium sulfate, ammonium sulfate, potassium sulfate or sodium phosphate; (2) extruding an aqueous solution of PVA polymer into an aqueous solution of alkali, e.g., sodium hydroxide potassium hydroxide and lithium hydroxide, and (3) extruding an aqueous solution of PVA polymer containing boric acid or a salt thereof into an aqueous alkaline solution of sodium hydroxide and sodium sulfate.

PVA solutions having an upper critical solution temperature (UCST) can be used to make porous PVA coatings. Water is a preferred solvent, but other solvents can be used, including alcohol/water mixtures, dimethyl sulfoxide, dimethylformamide, dimethylacetamide and N-methylpyrrolidone. These solutions are homogeneous above their UCST and must be coated at a temperature greater than their UCST. Solutions with UCST between about 30° C. to about 95° C. can preferably be used. These solutions can be made from PVA solutions containing polyethylene glycol, polypropylene glycol, tetraethylene glycol, triethylene glycol, ethylene glycol, lower alkyl alcohols, polyhydric alcohols such as glycerine and butanediol, and lower alkyl esters, such as ethyl lactate or butyl lactate. Thickening additives such as boric acid or acetic acid or mixtures can be used in small quantities, less than 1%. PVA concentrations of 5-20% are preferred. The amount of additive is determined experimentally to produce a solution with the desired UCST. The amount of additive depends on the amount and molecular weight of PVA and selection of additive.

The coated substrate can be made by a variety of methods. The coating can be formed from a preformed polymer. The general method is to contact the substrate with a solution of the polymer, and to remove excess solution. The next step is to fix the polymer to the substrate. This is done by removing the solvent and any additives that were in the solution. The polymer can be crosslinked, either during these steps, or in a separate step.

For simple solutions, all or a portion of the solvent may be removed by evaporation. Or the solution may contain a volatile solvent as part of the composition of the mixture making up the solvent. Then it may prove to be beneficial to remove the volatile solvent and/or a portion of the main solvent by evaporation with or without heating. The solvent and additives can also be removed by immersion in a liquid that does not dissolve the polymer, or remove any reactants (see below). For polymers that are insoluble in water, removal of solvent and additives that enhance solubility leaves the polymer permanently affixed to the substrate. There is usually a final washing and rinsing procedure. The fixed polymer can be then dried, or kept in a wetted state.

The polymer coating can be crosslinked either during the steps above or in a separate step after drying or after rinsing. These methods will be described in the further in this section and in the Examples.

In another method of forming a porous hydrogel on the substrate, a solution of reactive monomers is contacted with the substrate, and/or an insoluble or crosslinked polymer is formed in situ. The method has similarities with the preformed polymer method just described.

The solution can have multiple components. There will be a solvent, made of one or more solvents and possibly other components, such as non-solvents or poor solvents. There will be one or more monomers. The will usually be one or more multifunction molecules for crosslinking purposes. There will be in most cases a polymerization initiator. There may be a non-reactive or in some cases, a reactive polymer, for viscosity increasing purposes. There may be a surfactant to improve coatability of the solution to the substrate.

The solvent is usually aqueous, which includes 100% water, and mixtures of water and water miscible organic solvents to increase solubility of the monomers, crosslinkers, polymers, etc. Alcohols of less than four carbons, ketones such as acetone, MIBK, are typical. There may be cases where solvents such as dimethyl acetamide, dimethylsulfoxide, N-methylpyrrolidone, tetrahydrofuran may be needed. It is of course possible to make hydrogel polymers out of organic solutions if the final product is dried and rehydrated before use.

Monomers used to make ionically uncharged hydrogels usually contain hydroxyl or amide groups. Examples of hydrophilic monomers are 2-hydroxyethyl methacrylate, hydroxyethoxyethyl methacrylate, hydroxydiethoxyethyl methacrylate, methoxyethyl meth acrylate, methoxyethoxyethyl methacrylate, methoxydiethoxyethyl methacrylate, poly(ethylene glycol)methacrylate, methoxy-poly(ethylene glycol)methacrylate, methacrylic acid, sodium methacrylate, glycerol methacrylate, hydroxypropyl methacrylate, and hydroxybutyl methacrylates, acrylamide monomers such as acrylamide and substituted acrylamines, e.g., dimethylacrylamide, diethylacrylamide, diacetone acrylamide, N-(3-aminopropyl)methacrylamide, and analogous methacrylamide monomers, N-vinyl-pyrrolidines and diacroylpiperazine.

Charged hydrogels can be made from acrylic acid monomer, 2-acrylamido-2-methyl-1-propanesulfonic acid (AMPS), 3-sulfopropyl acrylate potassium salt, 2-(acryloyloxy)ethyltrimethyl-ammonium methyl sulfate, 4-vinylpyridine, acrylic acid, methacrylic acid, (3-(methacryloylamino)propyl)trimethylammonium chloride, (3-acrylamidopropyl)trimethylammonium chloride and aminopropylmethacrylamide.

Crosslinkers which can be used include ethylene glycol dimethacrylate, diethylene glycol dimethacrylate, triethylene glycol dimethacrylate and poly(ethylene glycol) dimethacrylate. oligo(polyhydroxyalkyl)silylmethacrylate ethylene-bis-acrylamide, methylene-bis-acrylamide, and piperazine diacrylamide.

Viscosity enhancing polymers useful for aqueous solutions include poly(ethylene glycol), poly(ethylene oxide), poly(vinyl alcohol), poly(vinylpyrrolidone), poly(ethyloxazoline), poly(ethylene oxide)-copoly(propyleneoxide) block copolymers, and polysaccharides.

Examples of suitable initiators include, for example, ammonium persulfate, potassium persulfate, azobis(4-cyanovaleric acid, Irgacure 2959 (Ciba-Geigy, Hawthorn, N.Y.), 2,2'-azobis(2-amidino-propane)hydrochloride and the like, potassium persulfate, 2,2'-azobis(2-amidinopropane) hydrochloride, potassium hydrogen persulfate.

In the method described below, the ranges of components are as follows (all concentrations are in weight %);

Monomer concentrations are from about 2% to about 20%, with a preferred range of from about 5% to about 15%.

Crosslink concentrations are from about 1% to about 10%, with a preferred range of from about 3% to about 6%.

The polymer additive concentration is from about 2% to about 30%, with a preferred range of from about 5% to about 20%. The preferred polymers are low molecular weight polyethylene glycols, of about 8000 molecular weight. High molecular weight polymers tend to be difficult to saturate porous substrates and are difficult to remove in the final washing steps.

Initiator concentrations are from about 0.1% to about 10%, with a preferred range of from about 0.25% to about 5%.

Surfactant concentration is from about 0.01% to about 10%, with a preferred range of from about 0.05% to about 5%. Anionic surfactants, such as sodium lauryl sulfate are a preferred class of surfactants.

The general method is to make up a solution of the monomer(s) and crosslinker, with the other components, in a water organic solvent mixture. The organic solvent is usually a volatile solvent that will be easily evaporated. Methanol and acetone are examples of preferred organic solvents. The volatile component can make up are from about 10% to about 50% of the total solution, with a preferred range of from about 20% to about 40%. In a preferred embodiment, the final composition is such that the viscosity allows easy penetration of the solution into the substrate, and complete wetting of all surfaces.

The substrate is contacted and saturated with the solution, and excess solution removed by rollers, scraping, or other means. The solution in the wetted substrate is allowed to evaporate, generally at low temperatures, to remove the volatile organic component. This decreases the overall mass in the substrate and increases the concentration of the dissolved material in the solution and concurrently, the viscosity. The result is that the remaining solution pulls back the solid phase of the substrate, e.g., the fibers in a non-woven fabric, and leaves a region in the substrate with no solution, a convective pore. It is also an important aspect of the process that some amount of water remain to allow the polymerization reaction to proceed.

One can form coatings from monomeric as well as polymeric systems. For example one can make acrylate, acrylamide or allylamine porous coatings from a monomeric system and polymerize them as part of the process. One takes the selected monomer or monomers, polymerizing agent, porogen and solvents and/or diluents and applies the resultant solution to a porous substrate. The solution is dried to remove at least a portion of the solvent and/or diluent and it is then polymerized such as by UV radiation. The porogen is then removed and the coated media is formed The coating solution of the above preferred process is now described with reference to being formed of polysaccharide, such as agarose, one or more gel-inhibiting agents such as various salts, and one or more solvents such as water for the coating material.

The polysaccharide, one or more gel-inhibiting agents and solvent are mixed and heated above the melting point of the polysaccharide. The melting point varies for different grades of polysaccharide, but typically for agarose it is between about 90° C. and 98° C., most commonly between 92° C. and about 98° C. This may be done in one step by combining and heating all three components together. Alternatively and preferably, one can first add the polysaccharide in powdered form to a solvent such as water and disperse the powder into a slurry. It is then heated to dissolve the polysaccharide and cooled it to form a gel. The gel is then reheated to a liquid solution and the gel-inhibiting agent is added and dissolved into the solution. Once it has completely dissolved, the solution is cooled, typically to about room temperature (23° C.).

In either method, the polysaccharide is dissolved by heating the dispersion in a range of from approximately 95° C. to the boiling temperature. This can be done, for example, in a stirred vessel, or in a microwave oven. The hot solution may be filtered if needed to remove gel or other particles. Once a clear solution is formed, the solution preferably is allowed to cool.

One may allow this cooling to occur naturally or one may, if desired, affirmatively cool the solution. At room temperature, the solution is a stable, non-gelled solution. The gel point (typically between 30° C. and 68° C.) is suppressed by the addition of the one or more gel-inhibiting agents.

The type of polysaccharide used will be determined by the properties desired of the final coating. The dispersion is made so that the final concentration of polysaccharide is between about 0.1% to about 20%, preferable between about 1% to about 10%, more preferably between about 2% to about 6%, by weight of total final solution.

While water is the preferred solvent for the polysaccharide, a minor amount, up to 20% by weight of the dissolving solution, of co-solvent may be added to improve solubility of the polysaccharide. Examples of suitable co-solvents are dimethylacetamide or dimethylsulfoxide. Others are known to those skilled in the art.

A gel-inhibiting agent is used to prevent the gel from re-gelling after melting and cooling. The agent may be added to the hot solution, or to the solution after cooling to a temperature above the gel point, or at any time prior to complete gelation. In a preferred method, a gel-inhibiting agent is added to the gelled solution. When added to the gel, the heat of solution tends to assist dissolution of the agent. Preferred agents are based on zinc, lithium or sodium salts such as $ZnCl_2$, LiCl, and NaOH. Zinc salts can be used at a concentration of greater than about 15% by weight, based on the dissolving solution, up to the solubility limit, about 45.8% for $ZnCl_2$, and about 54.6% for $Zn(NO_3)_2$. Lithium salts can be used at concentrations greater than about 18%, to their solubility limit, about 45.8% for LiCl, 51.0% for LiNO3, or 54.0% for LiSCN. NaOH can also be used at about IM concentration. A preferred salt is $ZnCl_2$.

The gel-inhibiting agent may also be a chaotrope, a small solute that enhances the ability of the solvent to dissolve polysaccharides. Non-limiting examples of such gel-inhibiting agents are urea and guanidinium salts at concentrations up to 8 M, inorganic salts and buffers such as KI, NaI, $MgCl_2$, potassium dihydrogen phosphate, disodium hydrogen phosphate, tris(hydroxymethyl)aminomethane, sodium tetraborate, and others known to those skilled in the art.

A porous substrate is then chosen from any of those discussed above.

The room temperature stable solution can be used as is for coating. It is preferable to add gel-modifying materials to the solution in order to modify and control the structure and properties of the final coating.

One class of added gel modifying materials comprises volatile organics, miscible with the solution. Examples are monohydric alcohols such as methanol, ethanol, and propanols. These can be used up to concentrations that give a slightly cloudy solution. Higher amounts of these alcohols can cause precipitation of the agarose. Preferred amounts are equi-volumetric with the water in the solution, more preferred is to add the alcohols to about 40% to about 60% of the water. A preferred alcohol is methanol. Miscible ketones such as acetone can also be used, but care must be used as the solubility of agarose is less in ketone-water mixtures. Any mixture of two or more of these materials is also contemplated.

Another class of added gel modifying materials comprises non-volatile miscible organics. Non-limiting examples of these included glycerine, ethylene glycol, methyl pentane diol, diethylene glycol, propylene glycol, triethylene glycol, the methyl, ethyl, or n-butyl ethers of ethylene glycol, the dimethyl or diethyl ethers of ethylene glycol, ethylene glycol dimethyl ether acetate ethylene glycol diethyl ether acetate, diethylene glycol methyl ether, diethylene glycol ethyl ether, diethylene glycol n-butyl ether, diethylene glycol dimethyl ether, diethylene glycol diethyl ether, diethylene glycol dimethyl ether acetate, diethylene glycol diethyl ether acetate, N-methyl morpholine, N-ethyl morpholine, and the like. polyethylene glycols of low molecular weight are also examples of materials that are in this class. Any mixture of two or more of these materials is also contemplated.

Another class of added gel modifying materials comprises water-soluble polymers, which include by way of examples, polyvinyl pyrrolidone, polyvinyl alcohol, polyethylene glycols, dextrans, and water-soluble polyacrylamides, including substituted polyacrylamides, such as polydimethylacrylamide. These polymers are believed to act as "porogens." That is, they control the amount of volume of the coating that is freely permeable to dissolved solutes when the coated porous substrate is in use.

These polymeric additives can be used as blends with the agarose in the initial dissolution step, or they can be dissolved in the solution with or after the added materials just discussed are mixed. Care must be taken not to add an excessive amount of polymer, as coagulation of the solution may occur. Ratios of polymer to agarose of from about 0.1 to 10 are possible. Preferred polymers are polyvinyl alcohol and dextrans. Polyacrylamides have also been found to be useful.

To obtain optimum coatability of the solution, one or more surfactants are added to the solution. Each combination of solution type and substrate may require some experimentation to determine the optimum type of surfactant for the desired coating system. Anionic surfactants have been found to be useful, with anionic fluorosurfactants being preferred. Of these, 3M FC-99 and FC-95 or equivalents from other suppliers are most preferred. These can be used in concentrations of from about 0.001% to about 10%, preferably from about 0.01% to about 5%, The substrate is impregnated with the coating such as soaking the substrate in a bath of the coating, applying the coating material by a doctor blade, spray nozzle, curtain coater, roll coater, extrusion coater or any other method known to one of ordinary skill in the art to apply a coating to a porous substrate. Excess coating material is removed such as by blotting or shaking the coated substrate, squeezing such as through a nip roller, scraping the surface of the coated substrate or by blowing air or a gas at the substrate's surface.

The solvent for the coating is then at least partially removed by evaporation. Preferably, this is a controlled evaporation such that the coating evaporates relatively uniformly throughout the entire substrate. The use of heat warmed air (preferably between 20 and 80° C.), microwave drying, vacuum oven drying and the like to control and/or sped evaporation may be used if desired. This causes a polysaccharide coating to be formed on the substrate surfaces that is dry to the touch, but still contains some residual moisture within it.

The coated substrate is then subjected to a gelling agent that removes the salts from the coating and causes the polysaccharide to form a porous hydrogel coating. The agent can be water, if done so as not to overly swell the coating. This can be done by controlling the previous solvent removal/drying step so that the water extracts the gel-inhibiting agents before deleterious swelling can occur. Once a large proportion of the gel-inhibiting agents are removed, swelling in water is reduced to a minimum. The use of water with added salts reduces the tendency of the aqueous rinse to swell the coating.

The use of organic solvents as the gelling agents to remove the gel-inhibiting agents without swelling the coating is preferred. Acetone, methanol, ethanol, or propanols are useful. Mixtures of from about 25% to about 95% acetone or methanol in water have been found to be useful. Similar acetone/methanol mixtures are also useful.

The substrate may be sprayed with the gelling agent, although preferably it is immersed into a bath containing the agent. The agent is preferably applied at room temperature.

The coated substrate is then rinsed with water and maintained preferably in a wet state. This rinsing step is generally done at temperatures between about 15° C. and about 50° C., preferably between 20° C. and 50° C. The coated substrate will have at least a portion of all of its surfaces (facial and interior surfaces) covered with a coating that is permeable to biomolecules. Preferably the coating is relatively uniformly applied to the substrate. More preferably, substantially all of the surfaces are covered by the coating. Also preferably, the coating is of relatively uniform thickness throughout the substrate.

The coating may then be crosslinked if desired by any of the chemistries commonly used in the industry to crosslink materials containing multiple hydroxyl groups, such as polysaccharide beads, these chemistries being as non-limiting examples, epichlorohydrin or other multifunctional epoxy compounds, various bromyl chemistries or other multifunctional halides; formaldehyde, glutaraldehyde and other multifunctional aldehydes, bis(2-hydroxy ethyl)sulfone, dimethyldichloro-silane, dimethylolurea, dimethylol ethylene urea, diisocyanates or polyisocyanates and the like.

For dextran coatings, the use of a crosslinking step is required. Typically this occurs after drying of the coating to the substrate but before rinsing, although some partial crosslinking of the solution before coating is applied may be done if desired.

It may also have one or more functionalities applied to it, including ligands, such as Protein A or Protein G, natural or recombinatorily derived versions of either, modified versions of Protein A or G to render them more caustic stable and the like, various chemical ligands such as 2-aminobenzimidazole (ABI), aminomethylbenzimidazole (AMBI), mercaptoethylpyridine (MEP) or mercaptobenzimidazole (MBI), or various chemistries that render the coating cationic, anionic, philic, phobic or charged, as is well-known in the art of media formation.

Functional groups used in liquid chromatography that are adaptable to the present invention include groups such as, but not limited to, ion exchange, bioaffinity, hydrophobic, groups useful for covalent chromatography, thiophilic interaction groups, chelate or chelating, groups having so called pi-pi interactions with target compounds, hydrogen bonding, hydrophilic, etc.

The media can then be placed into a holder and have a liquid stream (containing one or more desirable components capture in it) run through the media so that the desired components are separated from the rest of the liquid. Typically, it is the desired components that are captured from the liquid and the rest of the liquid including impurities passes through. Alternatively, the desired components may pass through and impurities can be captured by the media. The composite is washed to remove any unbound materials and then the captured material is eluted using a change in ionic strength, pH or the like.

If desired or required, one may apply a second or even more coating layers to the first in order to reach the desired thickness of coating(s), to change their chemical nature (i.e., layers of different coatings) and the like.

In one form, a series of individual fibers may be placed into a container having a porous surface such as a frit or filter and be retained there by that surface. Such devoices include but are not limited MICROCON® centrifugal filter devices available from Millipore Corporation of Billerica, Mass., STERI-CUP® filtration devices available from Millipore Corporation of Billerica or closed test tube such as is available from Fisher Scientific and the like. Fluid is added on top of the series of fibers and the selected molecule is adsorbed by the media. In using filter devices, the fluid is filtered through the porous support and the fibers are then washed and then treated with an eluant to recover the selected molecule. In a closed system the fluid after a suitable residence time can centrifuged and the liquid decanted. A similar process then occurs with the washing fluid and the eluant to recover the selected molecule of interest. Optionally, the series of fibers can be laid together and then the coating can be crosslinked before use to help form a unitary structure. Alternatively, the fibers after coating can be bound to each other by other mechanisms such as heat, adhesives and the like provided they don't adversely affect the adsorptive properties of the coated fibers.

In another form the continuous coated fiber is first formed by forming a coating on a continuous fiber such as a thread or monofilament. This can be done in a number of ways including running the fiber through a bath of coating, spraying the fiber with coating or running the fiber through a die coater.

The coated fiber is then wrapped or wound on to a mandrel that forms an inner porous core for a device. The wraps are spaced apart from each other and at various angles to the wrap below and above it so that convective pores are formed throughout the structure. The fibers maybe crosslinked after they have been wound into the porous depth filter. The wound core can be used as made and placed into a holder such as a filter holder, a chromatography column, or a capsule with flow distributors such as frits and the like at each end adjacent the inlet and outlet to the device. Fluid is then flowed through the device axially and the selected molecule is captured. Alternatively, fluid can be introduced along either the inner core or outer perimeter of the wound media and flow radially through the media exiting the opposing perimeter surface.

In applications where the binding affinity is large and flow uniformity is not a requirement, one can form a core having a wound, coated fiber or fibers on its outer surface. One of the two ends can be attached to an outlet and the other sealed, typically with an endcap. The core can be placed in a filter housing or a disposable capsule having an inlet such that fluid enters the housing or capsule through the inlet, flows the outer surface of the wound coated fibers and makes its way to the core where it passes through and then leaves the housing/capsule through the outlet. The selected molecule is captured by the coating as the fluid passes through the wound structure.

Figure 3:
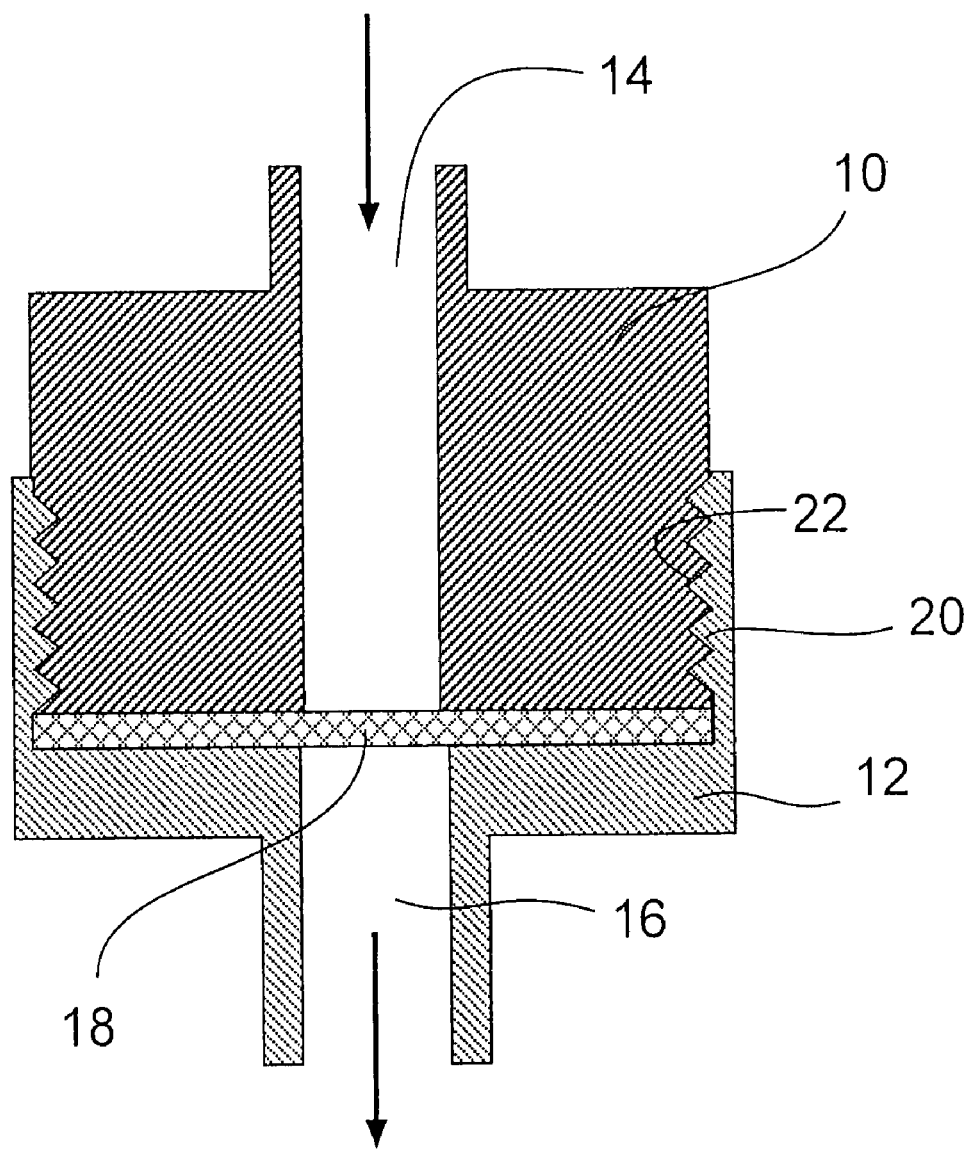
FIG. 3 shows a cross sectional view of a device containing the media of an embodiment according to the present invention.

In another form, a device incorporating the present media may be a simple plastic or metal filter holder such as a SWINNEX® plastic filter holder available from Millipore Corporation of Billerica, Mass. or a stainless steel filter holder available from Millipore Corporation of Billerica, Mass. These devices as shown in FIG. 3 are formed of two halves 10 and 12 each having a port 14 and 16 respectively for liquid flow into or out of the device. In this case half 10 has inlet 14 and half 12 has outlet 16. One or more sheets of media 18 (in this example one sheet is shown) according to the present invention is placed between the two halves 10 and 12 of the device and simply sealed between by clamping pressure, typically through a mated male/female threads 20 and 22 as shown.

Figure 4:
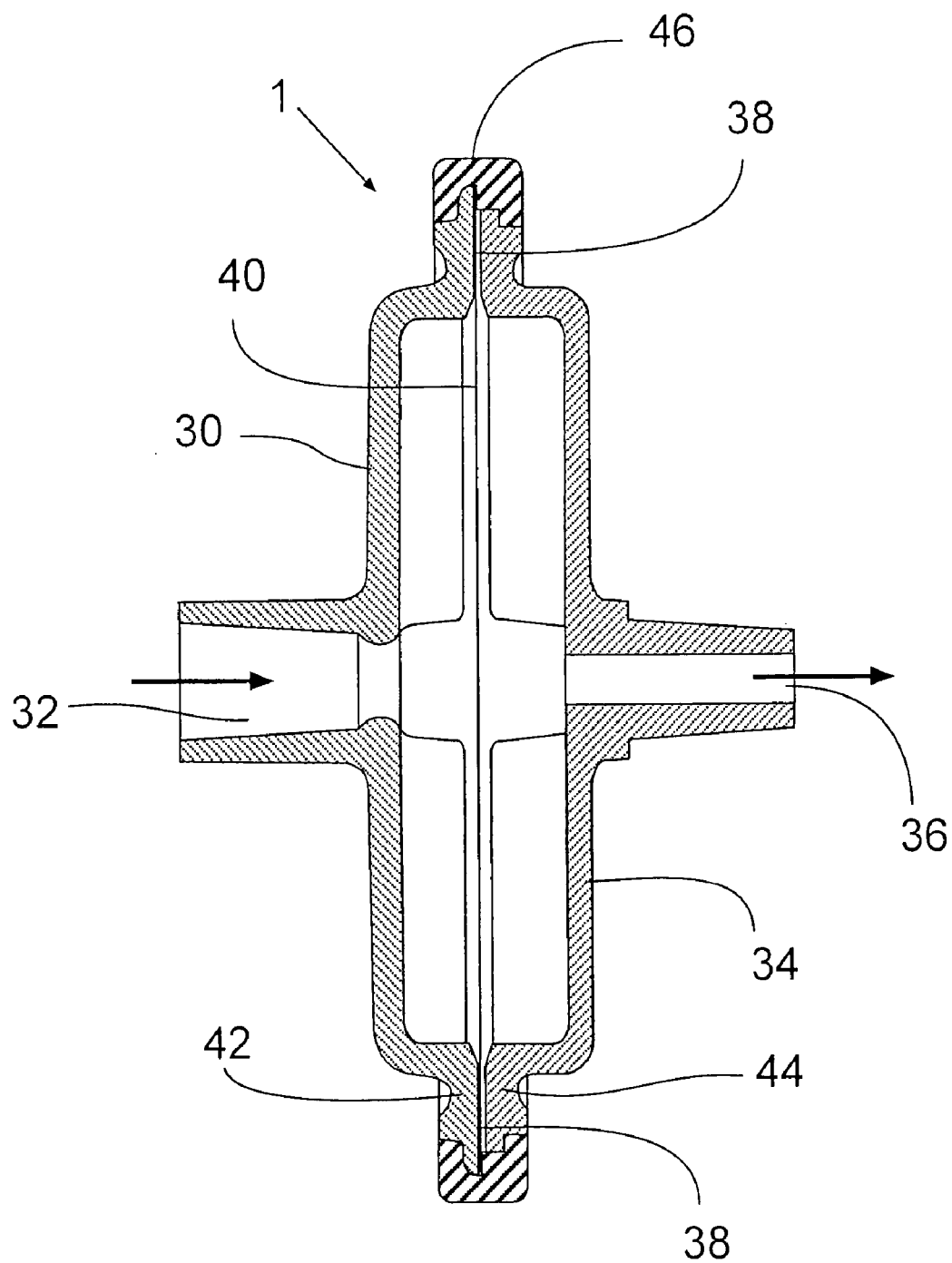
FIG. 4 shows a cross sectional view of a second device containing the media of an embodiment according to the present invention.

Another embodiment would permanently seal one or more layers between two plastic filter holder halves as shown in FIG. 4. Here the first half 30 has an inlet port 32 and the second half 34 has an outlet port 36. The outer peripheral edge 38 of the substrate 40 is trapped between the two halves 30 and 34. The outer peripheral edges 42 and 44 of the two halves 30 and 34 respectively are sealed together by an overmold of plastic 46 to form a liquid tightly sealed device. One such device is sold as MILLEX® filter available from Millipore Corporation of Billerica, Mass.

Figure 5:
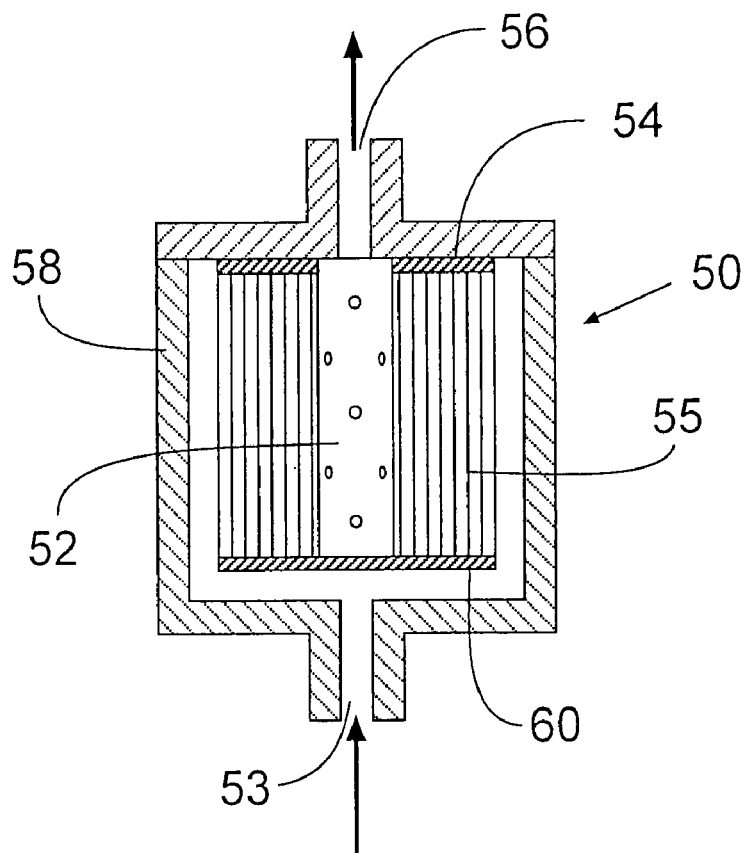
FIG. 5 shows a cross sectional view of another device containing the media of an embodiment according to the present invention.

The media may also be incorporated into a filter cartridge device FIG. 5 either as a pleated media or as a depth filter. A cartridge 50 contains a central core 52 that is connected to a first endcap 54 which forms an outlet 56 from the cartridge 50. The media 55 is upstream from the core 52. If desired a support layer or cage (not shown) may be used either on the outside or inside or both sides of the media 55 as is well known in the art. The media 55 is liquid tightly sealed to the first endcap 54 and a second endcap 60 at its respective ends so that all fluid entering the cartridge 50 through inlet 53 must flow through the media 55 before entering the core 52. An outer sleeve 58 surrounds the media 55 and is also sealed to the endcap 54 such as by mated threads, clamps, adhesives, solvent bonding, ultrasonic welding and the like. In the pleated form, one or more layers of media may be used. Likewise in the depth filter form the media maybe one thick layer, such as a mat or a felt or a monolith or it may be a single sheet of media that has been rolled up upon itself or it may be series of individual sheets on top of each other and sealed along their open two edges (not shown). The cartridge may go into a reusable housing that is liquid tight or it may have the outer sleeve liquid tight (as shown) so that the cartridge is in the form of a disposable capsule cartridge.

Figure 6:
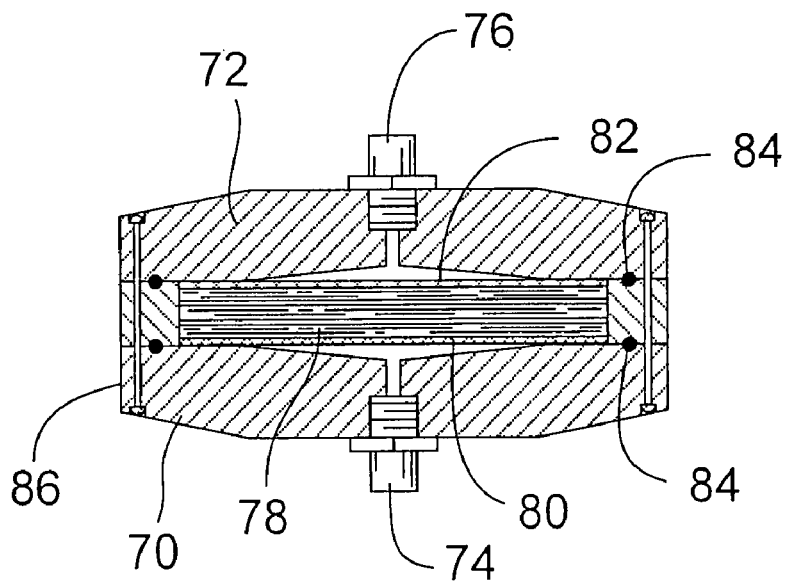
FIG. 6 shows a cross sectional view of a further device containing the media of an embodiment according to the present invention.

FIG. 6 shows another device embodiment. This design is also shown in U.S. Pat. No. 4,895,806 and consist of two halves, 70 and 72, the first half 70 having an inlet 74 and the second half 72 having an outlet 76. Inside the device are a plurality of media discs 78 stacked one on top of the other between a top and bottom porous substrate 80 and 82 respectively. Sealing around the circumference of the discs and the top and bottom of the stack of discs is provided by a series of gaskets 84.

Figure 7:
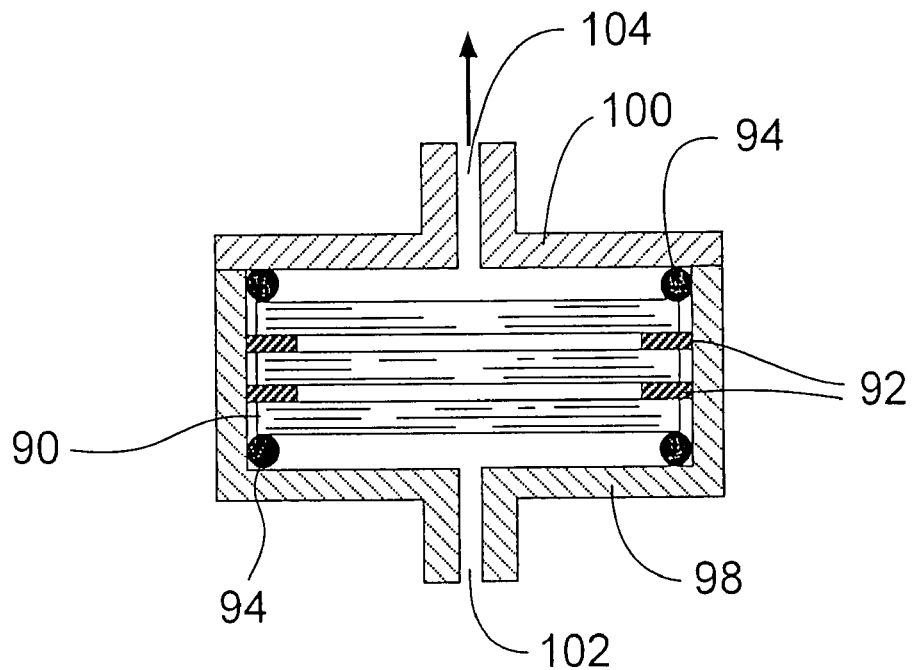
FIG. 7 shows a cross sectional view of an additional device containing the media of an embodiment according to the present invention.

FIG. 7 shows a variation on the design of FIG. 6 in which a series of media layers 90 are separated from each other by spacers 92 and are all liquid tightly sealed around the top and bottom circumferences of series of media layers 90 to the interior of the device by gaskets 94. The device is formed of two halves 98 and 100 with an inlet 102 and outlet 104 formed in respective ends of the two halves 98 and 100 of the device.

Figure 8:
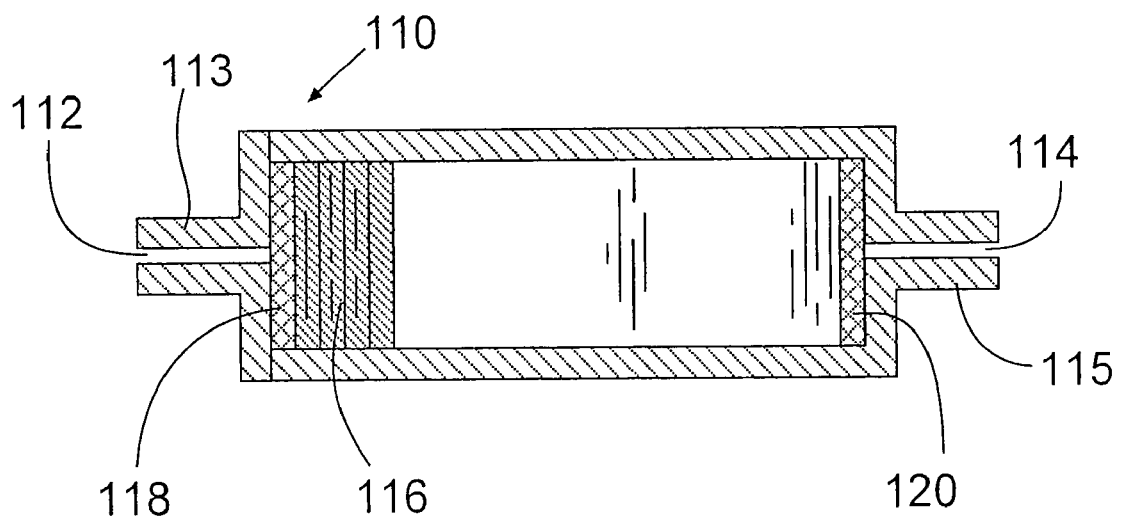
FIG. 8 shows a cross sectional view of another device containing the media of an embodiment according to the present invention.

FIG. 8 shows another device format formed of a cartridge 110 having an inlet 112 in one end 113 and an outlet 114 in the other end 115 and a series of layers of media 116 in between. Porous spacers, 118 and 120 are adjacent the inlet and outlet respectively and maintain the media in place. The media is formed of a size such that the media contacts the inner wall of the device so that all flow must be through the body of media rather than by passing the media along the inner wall or the like.

An additional embodiment of the present invention is to selectively coat only certain areas of a substrate with the coating of the present invention. This can be accomplished through the use of masks, tapes, screens, soluble polymers and the like that are set done in a preselected pattern so only the uncovered areas are coated. The use of patterns such as grids, circles, squares and the like are useful in these embodiments.

Figure 9:
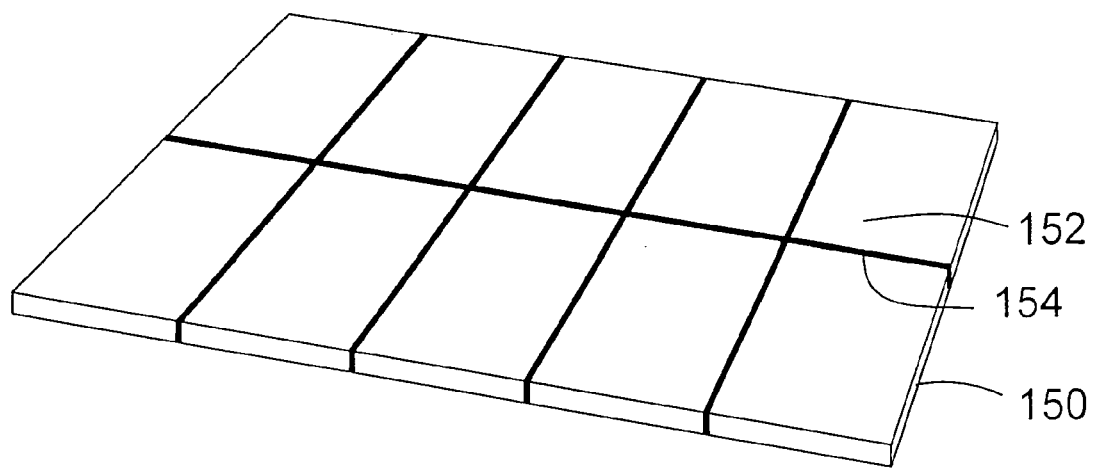
FIG. 9 shows a planar view of another embodiment of the media according to the present invention.

In FIG. 9 is shown another embodiment of the present invention. As shown, there is a porous substrate 150 that has one or more areas of coated materials 152 and one or more areas 154 that are not coated. In this arrangement, the non-coated area(s) 154 are formed as a series intersecting lines that form a series of square grids, the interior of each square are formed of coated area 152. Such gridded structures are useful in many applications such as in the analysis of proteins, DNA in fluids or as individual electrophoresis gels.

Figure 10:
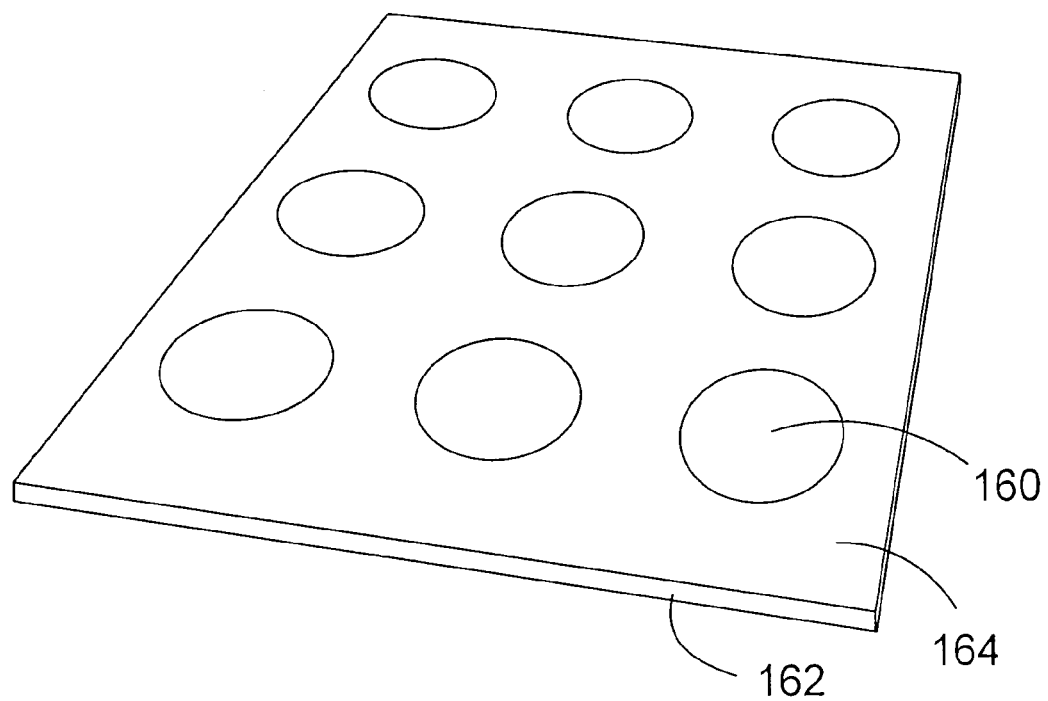
FIG. 10 shows a planar view of another embodiment of the media according to the present invention.

An alternative design is shown in FIG. 10, where the one or more coated areas 160 of the substrate 162 are circular in design and set out in even rows and columns. The area between the coated areas is a non-coated portion 164 of the substrate. Such a design is useful in protein capture and other small volume separations. It may also be incorporated as the filter in a multiwell plate with the coated areas aligning with the open bottom of the wells. The substrate can be attached to the plate as a single sheet of material and have the coating only where there is active filtration or flow. Optionally, the uncoated areas can be rendered non-porous or removed after attachment of the substrate to the wells to limit cross contamination (cross talk).

Other device designs can and are possible with the present invention including but not limited lenticular devices such as are shown in WO 01/83077A1.

This invention also allows for the polymeric adsorptive layer to function without the additional requirement of the mechanical stability of the adsorptive layer needed to handle flow rates and pressure drops associated with a packed bed of beads. The hydrogel mechanical properties are "decoupled" from the mechanical requirements of the packed chromatographic bed, because the porous substrate provides the required stability. In this way, the inverse relationship between pressure drop and separation resolution associated with bead media can be overcome. The porous material can consist of any porous material with the correct pore size and pore size distribution. The pore size distribution must be reasonably narrow to prevent large variations in liquid flow velocities through the material (this could adversely affect a desired chromatographic separation). Reduced plate heights of ~<0.1 cm are within the range of reasonable "pore size distribution". In this way, the diffusional pathway for an adsorbing entity will be short enough so that diffusion into and out of the hydrogel will not be the limiting parameter during the chromatographic separation as it is in current preparative scale bead media.

The media of the present invention can be used in lieu of conventional chromatography media to capture the selected molecule from a stream containing it along with other molecules and contaminants. It may be used in a primary clarification step in which relatively unfiltered cell broths; lysed cell broths and other crude process streams are initially treated to remove the larger contaminants. It may be used to treat blood or other bodily fluids to remove the selected molecule, be it a contaminant or undesired entity such as a pathogen or leukocyte or a desired molecule such as a growth hormone or the like. It may be used in classic chromatography application to purify proteins and other molecules. It may also be used to remove viruses, endotoxins and other impurities before a final release of the product. As can be appreciated the media of the present invention can be tailored to fit almost particular application or use.

Example 1

Room Temperature Stable Agarose Solution Suitable for Coating

Six grams of agarose powder (type XII, obtained from Sigma-Aldrich) were added to 40 grams of water, the mixture was agitated while heating at a temperature of 95° C. until an initial agarose solution was formed. This initial free flowing solution was cooled to room temperature, at which point the solution became a gel having no free flowing characteristics at all. To this gel, 15 grams of zinc chloride were added and the mixture was heated again to 95° C. while agitating until the gel and the salt dissolved to form a homogeneous solution. This solution was then cooled to room temperature; the solution's free flowing characteristics were retained at this temperature. To this solution, 39.9 grams of methanol and 0.1 grams of Fluorad FC-95 fluorosurfactant (3M Company) were added while mixing to form the final agarose solution. This final solution remained liquid at room temperature.

Example 2

Coating Using Room Temperature Stable Agarose

A polyolefin non-woven fabric having a pore size of about 100 microns and a porosity of about 65% (Type FO2463 from Freudenberg of Lowell, Mass.) was coated with the agarose solution of Example 1 according to the following procedure. The fabric was exposed to the agarose solution of Example 1 such that the fabric was completely wetted by the solution. The wet fabric was then placed between two sheets of polyethylene film and squeezed gently to remove excess solution from the surface of the fabric, the fabric was then removed from the film sheets and allowed to dry at room temperature to remove the methanol and unbound water by evaporation. The dry coated fabric was then immersed in acetone to gel the agarose and to remove the salt and surfactant thus creating the coating of essentially pure agarose. The coated fabric was immersed in water to further rinse the fabric and to remove the acetone, the agarose coated fabric was then kept in water.

Example 3

Crosslinking of Agarose Coating

The water-wet agarose coated fabric from example 2 was immersed in a mixture containing 5 grams of epichlorohydrin and 95 grams of 2M sodium hydroxide, the temperature of this mixture was then raised to 50° C. and the crosslinking reaction was allowed to proceed at this temperature for 16 hours under gentle agitation. The crosslinked coated fabric was rinsed with water several times to remove excess reactants and base.

Example 4

Functionalization of Crosslinked Agarose Coating with Sulfopropyl (SP) Groups

The crosslinked agarose coated fabric of example 3 was immersed in a solution containing 6 grams of sodium bromopropanesulfonate 94 grams of 1 M sodium hydroxide, the temperature of this solution was then raised to 50° C. and the functionalization reaction was allowed to proceed at this temperature for 16 hours under gentle agitation. The sulfopropyl functionalized coated fabric was rinsed with water several times to remove excess reactants and base, the fabric was kept in water. The permeability of the modified fabric was measured to be 1.78 $cm^2$/min-psi in a sodium in a sodium acetate buffer at pH 4.5 and conductivity of 8 mS.

Example 5

Protein Binding of SP Functionalized Agarose Coated Fabric

A 13 mm disk of the SP functionalized agarose coated fabric from example 4 was immersed in 6 ml of phosphate buffer at pH 7, conductivity of 2 mS and containing lysozyme in a concentration of 1 g/L, the fabric was allowed to remain in contact with the protein solution for 16 hours at room temperature under agitation. After 16 hours, the concentration of lysozyme in the protein solution was measured and the amount of protein bound to the fabric was calculated based on the volume of the 13 mm disk of fabric. The protein binding capacity of the fabric was measured to be 50 mg lysozyme/ml fabric. The water flow rate through the media was determined by measuring the flow rate through a circular sample of the modified fabric having a diameter of 13 mm and using a column of water 15 cm in height. The sample had a flow rate of water of 50 ml in 14 seconds under these conditions. The uncoated substrate had a flow rate of 50 ml in 6 seconds under the same conditions.

Example 6

Cellulose Coating on Substrate

A polyolefin non-woven fabric of Example 2 having a pore size of about 100 microns and a porosity of about 65% was coated with agarose according to the following procedure. The fabric was exposed to a solution containing 3 grams cellulose and 97 grams of N,N-dimethylacetamide saturated with lithium chloride, such that the fabric was completely wetted by the solution. The wet fabric was then placed between two sheets of polyethylene film and squeezed gently to remove excess solution from the surface of the fabric, the fabric was then removed from the film sheets and immediately immersed in water for 10 minutes to form the coating. The cellulose coated fabric was kept in water. The coated fabric was crosslinked and SP functionalized following the procedures of Examples 3 and 4. The lysozyme binding capacity of the modified fabric was measured according to the procedure of Example 5. The lysozyme binding capacity of the coated fabric was measured to be 120 mg/ml fabric.

Example 7

Dextran Coating on Substrate

A polyolefin non-woven fabric of Example 2 having a pore size of about 100 microns and a porosity of about 65% was coated with dextran according to the following procedure. A coating solution was prepared containing 15 g dextran (500,000 MW), 1 g polyethylene glycol diglycidyl ether, 20 g polyacrylamide solution (10% in water), 1.5 g 1 N sodium hydroxide and 62.5 g water. The non-woven fabric was exposed to the above dextran coating solution such that the fabric was completely wetted by the solution. The wet fabric was then placed between two sheets of polyethylene film and squeezed gently to remove excess solution from the surface of the fabric, the fabric was then removed from the film sheets and allowed to dry at room temperature. The dry, coated fabric was then placed in an oven at 85° C. for 4 hours to effect crosslinking of the dextran. The coated fabric was then rinsed in water several times to remove any unreacted materials, including the polyacrylamide. The coated fabric was kept in water. The crosslinked dextran coated fabric was then SP functionalized according to the procedure of Example 4 and the lysozyme binding capacity was measured according to the procedure of Example 5. The lysozyme binding capacity of the coated fabric was measured to be 28 mg/ml fabric.

Example 8

Polyallylamine Coated Substrate

A reaction medium having a pH of 9 was prepared using the following formulation:
  11.6% polyallylamine
  11.6% sodium chloride
  23.2% polyethyleneimine epichlorohydrin-modified (17% solution in water)
  18.6% sodium hydroxide (1.0 N solution)
  34.9% water A 0.45µ ultrahigh molecular weight polyethylene (UPE) membrane was prewet with methanol and directly contacted with the above solution for about 5 minutes. The wet membrane was placed in a polyethylene film bag and the bag was placed in an oven set at 85° C. for 7 minutes while being careful not to dry out the membrane to initiate the crosslinking reaction. The wet membrane was then removed from the bag and allowed to dry at room temperature. The dry membrane was then placed in an oven at 10° C. for four hours to complete the crosslinking reaction. The membrane was then thoroughly washed with water, methanol and hydrochloric acid (1.0 N) and allowed to dry at room temperature. The membrane was found to wet with water completely and had a strong affinity for Ponceau —S, an anionic dye.

Example 9

Monomeric Coating

A monomer solution was formulated as follows: 12.5 g acylamidopropane sulfonic acid, 1.875 g methylene bisacrylamide, 6.8 mL 50% NaOH, 3.8 g sodium dodecylsulfate, 25 g of polyethylene glycol (MW 8,000) and 76 g water. This solution was then diluted by 125 mL of acetone with 0.5% Irgacure 2959 photoinitiator to form a coating solution. This solution was applied to a non-woven (Freudenberg FO2463) such that the non-woven was completely filled with the coating solution. The non-woven was then air dried for 1-15 minutes to remove the majority of the acetone. The non-woven was then run through a UV initiation chamber at a frequency of about 200 to 450 nm and an exposure time of about 2 seconds and polymerization of the monomer solution occurred. The sample was then washed in a series (3) of water baths for 24 hours. The lysozyme binding capacity of the coated fabric was measured to be 64 mg/ml fabric.

Example 10

Monomeric Coating

A monomer solution of Example 9 was formulated except that it was diluted with 208 mL of acetone containing 0.375% Irgacure 2959 photoinitiator to form the coating solution. This solution was applied according to Example 9. The lysozyme binding capacity of the coated fabric was measured to be 68 mg/ml fabric.

Example 11

Monomeric Coating

A monomer solution of Example 9 was formulated except that it was diluted with 375 mL of acetone containing 0.25% Irgacure 2959 photoinitiator to form the coating solution. This solution was applied according to Example 9. The lysozyme binding capacity of the coated fabric was measured to be 70 mg/ml fabric.

Example 12

Monomeric Coating

A monomer solution of Example 9 was formulated except that no dodecylsulfate was used in the coating solution. This solution was applied according to Example 9. The lysozyme binding capacity of the coated fabric was measured to be 110 mg/ml fabric. It had an ion exchange capacity of 285 ⌠eq/mL.

Example 13

Monomeric Coating on Nylon Substrate

A monomer solution was formulated as follows: 12.5 g acylamidopropane sulfonic acid, 1.875 g methylene bisacrylamide, 6.8 mL 50% NaOH, 25 g of polyethylene glycol (MW 8,000) and 80 g water. This solution was then diluted by 125 mL of acetone with 0.25% Irgacure 2959 photoinitator form a coating solution. This solution was wicked into a woven nylon screen (Millipore Corp., 60 micron mesh) such that the non-woven was completely filled with the coating solution. The non-woven was then air dried for 1-15 minutes to remove the majority of the acetone. The non-woven is then run through a UV initiation chamber at a frequency of about 200 to 450 nm and an exposure time of about 2 seconds and polymerization of the monomer solution occurred. The sample was then washed in a series (3-5) of water baths for 24 hours, The resulting woven had an adsorptive coating thickness of ~10-30 microns as determined by optical microscopy. The lysozyme binding capacity of the coated fabric was measured to be 67 mg/ml fabric.

Comparative Example 1

Agarose Coating According to WO 00/44928 on Substrate

An 8 M urea solution in water was prepared by dissolving 24.4 g urea in 50 ml water. A 2.5% (w/v) solution of agarose was prepared by dissolving 1.25 g agarose (type XII, obtained from Sigma-Aldrich) in 50 ml of the 8 M urea solution.

A polyolefin non-woven fabric of Example 2 having a pore size of about 100 microns and a porosity of about 65% was modified with agarose according to the following procedure. The fabric was exposed to the above agarose solution in 8 M urea for five minutes such that the fabric was completely wetted by the solution. The wet fabric was then removed from the agarose solution and immediately placed in deionized water for 24 hours. The modified fabric was then kept in water. The water flow rate through the fabric was determined by measuring the flow rate through a circular sample of the modified fabric having a diameter of 13 mm and using a column of water 15 cm in height. The sample did not show any measurable flow under these conditions, suggesting that the pores of the fabric were substantially plugged by the agarose.

The advantages and results achieved through practice of the present invention include a novel composite media for separations where the binding capacity is greater than the surface binding capacity (capacity based on surface area, monolayer binding) but the diffusional distance required for an adsorbing entity to travel is sufficiently short so it does not hinder the mass transport. Therefore, the dynamic binding capacity is essentially independent of the convective flow rate; a novel media where the adsorbing/interacting material does not determine the mechanical properties of the chromatographic bed.

The "decoupling" of mechanical and chromatographic performance allows for a larger optimization window for media development; a novel media with high resolution bead performance (similar to a=30 μm bead), but with a permeability similar to or greater than a preparative scale bead media (90 μm bead). A high resolution preparative media for the separations of biomolecules and other entities of interest; a novel media where the binding capacity is greater than the binding capacity expected based on the surface area of the porous substrate; a novel media that does not require packing of the media before use. (As is typically required with bead materials) The composite porous materials/adsorbent hydrogel material can be fabricated into a "cartridge" device as thus not require packing prior to use and a novel media that could be disposable. The media cartridge could be easily disconnected and disposed of without an "unpacking" procedure.

The invention claimed is:

1. A porous coated media for adsorption or chromatography based separations capable of adsorbing biomolecules, synthetic molecules or other selected molecules comprising a base substrate formed of ultrahigh molecular weight polyethylene, the base substrate being a porous, self-supporting structure, and one or more porous crosslinked polyallylamine coatings formed on at least a portion of all surfaces of the porous substrate, the one or more porous coatings having a void volume fraction of the substrate of at least 1%.

2. The media of claim 1 wherein the porous substrate is in a form selected from the group consisting of a sheet, a fiber and a monolith.

3. The media of claim 1 wherein the one or more porous coatings are formed on substantially all the surfaces of the substrate.

4. The media of claim 1 wherein the porous substrate is a membrane.

5. The media of claim 1 wherein the porous substrate has a pore size of from about 20 microns to about 200 microns.

6. The media of claim 1 wherein the porous coating has a thickness of from about 2 microns to about 50 microns.

7. The media of claim 1 wherein the porous coating further comprises one or more functional groups selected from the group consisting of ion exchange, bioaffinity, hydrophobicity, covalent chromatography, thiophilic interaction, chelation, pi-pi interactions, hydrogen bonding and hydrophilicity.

8. A porous coated membrane for adsorption based separations having good convective and diffusional flow characteristics and high dynamic capacity comprising an ultrahigh molecular weight polyethylene porous, self-supporting membrane having a pore size about 0.1 micron to about 10 microns, and one or more porous crosslinked polyallylamine coatings containing ion exchange functional groups formed on all surfaces of the membrane, the one or more coatings occupying from about 1% to about 50% of the void volume of the pores of the membrane.

9. A porous coated membrane for adsorption based separations having good convective and diffusional flow characteristics and high dynamic capacity comprising an ultrahigh molecular weight polyethylene microporous, self-supporting membrane and one or more porous crosslinked polyallylamine coatings containing ion exchange functional groups formed on all surfaces of the membrane, the one or more porous coatings having a thickness from about 2 microns to about 20 microns and occupying from about 10% to about 50% of the void volume of the pores of the membrane.

10. A porous coated membrane for adsorption based separations wherein the dynamic binding capacity of the porous coated membrane is essentially independent of the convective flow rate of the porous coated membrane, comprising a base membrane formed of ultrahigh molecular weight polyethylene, the base membrane being a porous, self-supporting structure and one or more porous crosslinked polyallylamine polymeric coatings formed on all surfaces of the membrane, the one or more porous coatings occupying from about 1 to about 50% of the void volume of the pores of the membrane.

11. The porous coated membrane of claim 10 wherein the porous coating further comprises one or more functional groups selected from the group consisting of ion exchange, bioaffinity, hydrophobicity, covalent chromatography, thiophilic interaction, chelation, pi-pi interactions, hydrogen bonding and hydrophilicity.

12. A porous coated membrane for chromatographic or adsorption separations comprising an ultrahigh molecular weight polyethylene membrane having a first facial surface and a second facial surface, both surfaces being porous, and a porous thickness between the facial surfaces forming an internal surface, said membrane having a porous crosslinked polyallylamine coating substantially covering the internal surface and facial surfaces.

13. The porous coated membrane of claim 12 wherein the porous coating further comprises one or more functional groups selected from the group consisting of ion exchange, bioaffinity, hydrophobicity, covalent chromatography, thiophilic interaction, chelation, pi-pi interactions, hydrogen bonding and hydrophilicity.

14. A porous coated chromatographic media comprising a porous ultrahigh molecular weight polyethylene membrane and a porous crosslinked polyallylamine coating on a surface of said membrane.

15. The chromatographic media of claim 14 wherein the porous coating further comprises one or more functional groups selected from the group consisting of ion exchange, bioaffinity, hydrophobicity, covalent chromatography, thiophilic interaction, chelation, pi-pi interactions, hydrogen bonding and hydrophilicity.

16. A porous coated composite media having a fractional porosity from about 0.35 to about 0.55 and capable of adsorbing biomolecules, synthetic molecules or other selected molecules comprising a porous ultrahigh molecular weight polyethylene membrane having a pore size about 10 microns to about 300 microns and a porous crosslinked polyallylamine coating on a surface of said membrane having a thickness from about 1 micron to about 100 microns.

17. The media of claim 16 wherein the porous coating further comprises one or more functional groups selected from the group consisting of ion exchange, bioaffinity, hydrophobicity, covalent chromatography, thiophilic interaction, chelation, pi-pi interactions, hydrogen bonding and hydrophilicity.

18. The media of claim 16, wherein the porous coating has a pore size about 1 nanometer to about 200 nanometers.

19. The media of claim 16, wherein the porous coating is formed on substantially all the surfaces of the membrane, and has a thickness about 1 micron to about 30 microns.

20. The media of claim 16, wherein the porous crosslinked polyallylamine coated membrane is selected from the group consisting of a gridded filter, curricular shaped filter, disc shaped filter, pleated filter, depth filter and combinations thereof.

21. A composite separation media comprising:
an ultrahigh molecular weight polyethylene microporous membrane having a pore size about 0.1 micron to about 10 microns, and
a porous crosslinked polyallylamine coating on at least a portion of all surfaces of the membrane, having a pore size about 1 nanometer to about 200 nanometers, and a thickness about 2 microns to about 20 microns,
wherein the porous crosslinked polyallylamine coating occupies about 1% to about 50% of the void volume of the pores of the ultrahigh molecular weight polyethylene porous membrane.

22. The composite separation media of claim 21, wherein the porous crosslinked polyallylamine coating further comprises ion exchange functional groups.

23. The composite separation media of claim 21, wherein the porous crosslinked polyallylamine coated membrane is selected from the group consisting of a gridded filter, curricular shaped filter, disc shaped filter, pleated filter, depth filter and combinations thereof.

24. The composite separation media of claim 21, wherein the porous crosslinked polyallylamine coated membrane is incorporated into a device selected from the group consisting of a plastic holder, laboratory device, syringe, microtiter plate, metal holder, filter cartridge, and cartridge.

* * * * *